United States Patent
Li

(10) Patent No.: US 9,551,585 B2
(45) Date of Patent: Jan. 24, 2017

(54) VEHICLE ASSISTANCE DEVICE

(71) Applicant: FIH (HONG KONG) LIMITED, Kowloon (HK)

(72) Inventor: Yu-Lun Li, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/688,454

(22) Filed: Apr. 16, 2015

(65) Prior Publication Data

US 2016/0123754 A1 May 5, 2016

(30) Foreign Application Priority Data

Oct. 29, 2014 (TW) .............................. 103137514 A

(51) Int. Cl.
*G01C 21/34* (2006.01)
*B60K 35/00* (2006.01)
*G01C 21/36* (2006.01)

(52) U.S. Cl.
CPC ........... *G01C 21/3469* (2013.01); *B60K 35/00* (2013.01); *G01C 21/3697* (2013.01); *B60K 2350/1092* (2013.01)

(58) Field of Classification Search
USPC ........................................................ 701/123
See application file for complete search history.

(56) References Cited

U.S. PATENT DOCUMENTS

| 6,591,185 B1* | 7/2003 | Polidi ................ G01C 21/3469 180/69.4 |
| 2012/0191289 A1* | 7/2012 | Guo .................... G01C 21/3697 701/29.1 |
| 2014/0052368 A1* | 2/2014 | Varughese ............. B60K 15/00 701/123 |

\* cited by examiner

*Primary Examiner* — Anne M Antonucci
(74) *Attorney, Agent, or Firm* — Zhigang Ma

(57) ABSTRACT

A fuel supply prompting method obtains a remaining fuel level of a vehicle from a detection unit, determines a fuel economy of the vehicle, and determines an available moving distance of the vehicle that the remaining fuel level can sustain according to the fuel economy of the vehicle. The method recalls a navigation system to determine a distance of a route from a current position of the vehicle to a destination. The method compares the available moving distance with the distance of the route from the current position of the vehicle to the destination, to determine whether the vehicle can reach the destination without refueling. The method further generates a first prompt when the vehicle cannot reach the destination without refueling. And a related vehicle assistance device is also provided.

12 Claims, 3 Drawing Sheets

VEHICLE ASSISTANCE DEVICE

CROSS-REFERENCE TO RELATED APPLICATIONS

This application claims priority to Taiwanese Patent Application No. 103137514 filed on Oct. 29, 2014, the contents of which are incorporated by reference herein.

FIELD

The subject matter herein generally relates to vehicle assistance devices, and particularly, to a vehicle assistance device capable of prompting fuel supply.

BACKGROUND

A distance that a vehicle can travel depends on remaining fuel.

BRIEF DESCRIPTION OF THE DRAWINGS

Implementations of the present technology will now be described, by way of example only, with reference to the attached figures.

DETAILED DESCRIPTION

Figure 1:
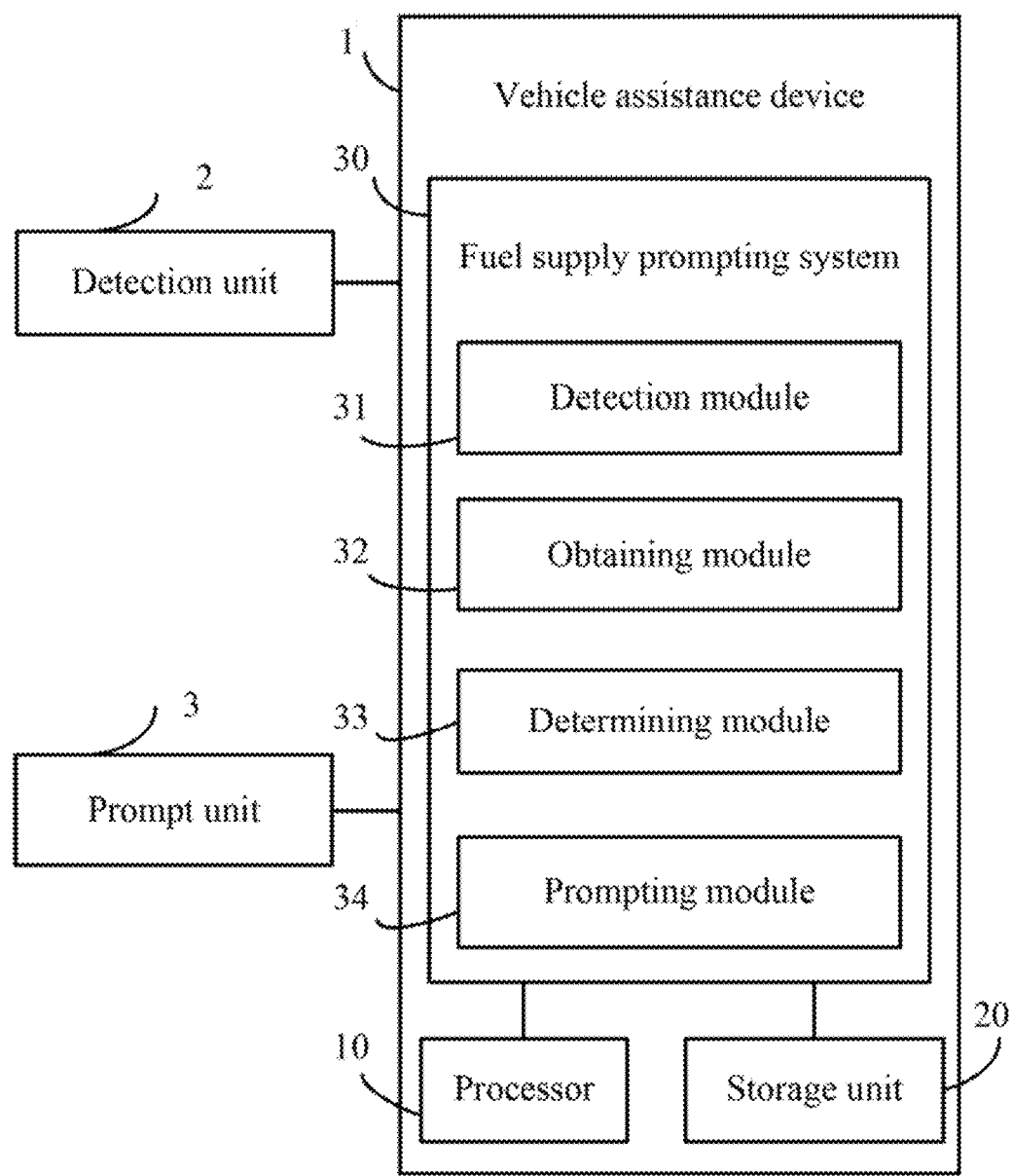
FIG. 1 is a block diagram showing an embodiment of a vehicle assistance device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device. The term "comprising" means "including, but not necessarily limited to"; it specifically indicates open-ended inclusion or membership in a so-described combination, group, series and the like.

Embodiments of the present disclosure will be described in relation to the accompanying drawings.

Figure 2:
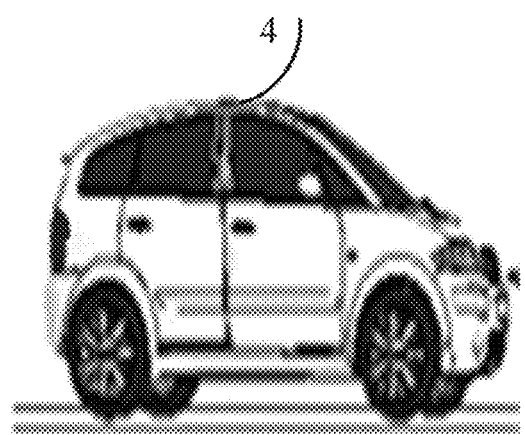
FIG. 2 is an isometric view showing an embodiment of a vehicle.

FIG. 1 illustrates an embodiment of a vehicle assistance device 1 connecting to a detection unit 2 and a prompt unit 3. The detection unit 2 and the prompt unit 3 can be built-in the vehicle assistance device 1 or be external of the vehicle assistance device 1. The detection unit 2 can detect a remaining fuel level of a vehicle 4 (see FIG. 2). In the embodiment, the vehicle 4 can be a truck, a car, a bus or the like. The detection unit 2 can be a level sensor, or a fuel sensor, or the like. The prompt unit 3 can be a loudspeaker, a display unit, an electronic device with the loudspeaker and display unit, fluorescent lamp, and/or the like. The vehicle assistance device 1 can be configured to assist a driver of the vehicle 4. In detail, the vehicle assistance device 1 can determine whether the vehicle 4 can reach a destination without refueling via the detection unit 2, and further control the prompt unit 3 to prompt the driver when the vehicle 4 cannot reach the destination without refueling.

In the embodiment, the vehicle assistance device 1 can include a processor 10 and a storage unit 20. The vehicle assistance device 1 can further include a fuel supply prompting system 30. In the embodiment, the fuel supply prompting system 30 can be executed in response to user operation, such as, inputting a destination in a navigation system. The navigation system can determine a current position of the vehicle 4, determine a gas station nearest the destination (hereinafter nearest gas station), and determine a suitable route from the current position of the vehicle 4 to the destination and a suitable route from the destination to the nearest gas station. In the embodiment, the fuel supply prompting system 30 can include a detection module 31, an obtaining module 32, a determining module 33, and a prompting module 34. One or more programs of the function modules can be stored in the storage unit 20 and executed by the processor 10. The processor 10 can be a central processing unit, a digital signal processor, or a single chip, for example. The storage unit 20 can be a hard disk, a compact disk, or a flash memory, for example.

In the embodiment, the detection module 31 can be configured to obtain the remaining fuel level of the vehicle 4 from the detection unit 2, determine a fuel economy of the vehicle 4, and determine an available moving distance of the vehicle 4 that the remaining fuel level can sustain (hereinafter available moving distance) according to the fuel economy of the vehicle 4. In the embodiment, the fuel economy of the vehicle 4 can be provided by a vehicle manufacturer to be a default value, thus the detection module 31 can determine the fuel economy of the vehicle 4 according to the default value. The fuel economy of the vehicle 4 provided by the vehicle manufacturer can be a constant-speed fuel economy, namely, a fuel consumption of a vehicle travelling 100 kilometers on a flat road at a constant speed. However, driver behavior can affect fuel economy, maneuvers such as sudden acceleration and heavy braking can increase fuel economy. Thus the fuel economy of the vehicle 4 provided by the vehicle manufacturer may be less than an actual fuel economy of the vehicle 4, and accordingly, the available moving distance may be greater than an actual moving distance of the vehicle 4 that the remaining fuel level sustains. In an alternative embodiment, the fuel economy of the vehicle 4 can be input by a driver depending on driving experience, thus the detection module 31 can determine the fuel economy of the vehicle 4 according to the input fuel economy of the vehicle 4. In other embodiments, the detection module 31 can detect a movement distance traveled by the vehicle 4 during a preset period (hereinafter traveled distance), detect an amount of fuel consumed by the vehicle 4 during the preset period (hereinafter consumed fuel), and divide the traveled distance by the consumed fuel to determine the fuel economy of the vehicle 4.

In the embodiment, the obtaining module 32 can be configured to recall the navigation system to determine a distance of the route from the current position of the vehicle 4 to the destination.

In the embodiment, the determining module 33 can be configured to compare the available moving distance with the distance of the route from the current position of the vehicle 4 to the destination, to determine whether the vehicle 4 can reach the destination without refueling. The available moving distance may be greater than the actual moving distance of the vehicle 4 that the remaining fuel level sustains, thus if the vehicle 4 is determined to can reach the destination without refueling, the available moving distance must be greater than a sum of the distance of the route from the current position of the vehicle 4 to the destination and a preset distance (such as 10 kilometers). In detail, when the available moving distance is greater than or equal to the sum of the distance of the route from the current position of the vehicle 4 to the destination and the preset distance, the determining module 33 determines that the vehicle 4 can reach the destination without refueling. When the available moving distance is less than the sum of the distance of the route from the current position of the vehicle 4 to the destination and the preset distance, the determining module 33 determines that the vehicle 4 cannot reach the destination without refueling.

In the embodiment, the prompting module 34 can be configured to generate a first prompt to the prompt unit 3 when the determining module 33 determines that the vehicle 4 cannot reach the destination without refueling. In the embodiment, the first prompt can be configured to prompt that the vehicle 4 cannot reach the destination without refueling. In other embodiments, the first prompt can be configured to prompt to refuel the vehicle 4. In the embodiment, the first prompt can be an audio file, an image, a video file, a light, and/or the like.

In the embodiment, the obtaining module 32 can be further configured to recall the navigation system to determine a distance of the route from the destination to the nearest gas station when the determining module 33 determines that the vehicle 4 can reach the destination without refueling.

The determining module 33 can be further configured to determine whether the vehicle 4 can reach the nearest gas station without refueling according to the distance of the route from the destination to the nearest gas station. In detail, the determining module 33 can be further configured to determine a total distance to be a total of the distance of the route from the current position of the vehicle 4 to the destination and the distance of the route from the destination to the nearest gas station, and compare the available moving distance with the total distance to determine whether the vehicle 4 can reach the nearest gas station without refueling. If the available moving distance is greater than or equal to a sum of the total distance and the preset distance, the determining module 33 determines that the vehicle 4 can reach the nearest gas station without refueling. If the available moving distance is less than the sum of the total distance and the preset distance, the determining module 33 determines that the vehicle 4 cannot reach the nearest gas station without refueling.

The prompting module 34 can be further configured to generate a second prompt to the prompt unit 3 when the determining module 33 determines that the vehicle 4 cannot reach the nearest gas station without refueling. In the embodiment, the second prompt can be configured to prompt that the vehicle 4 cannot reach the nearest gas station without refueling. In other embodiments, the second prompt can be configured to prompt to refuel the vehicle 4. In the embodiment, the second prompt can also be an audio file, an image, a video file, a light, and/or the like.

Figure 3:
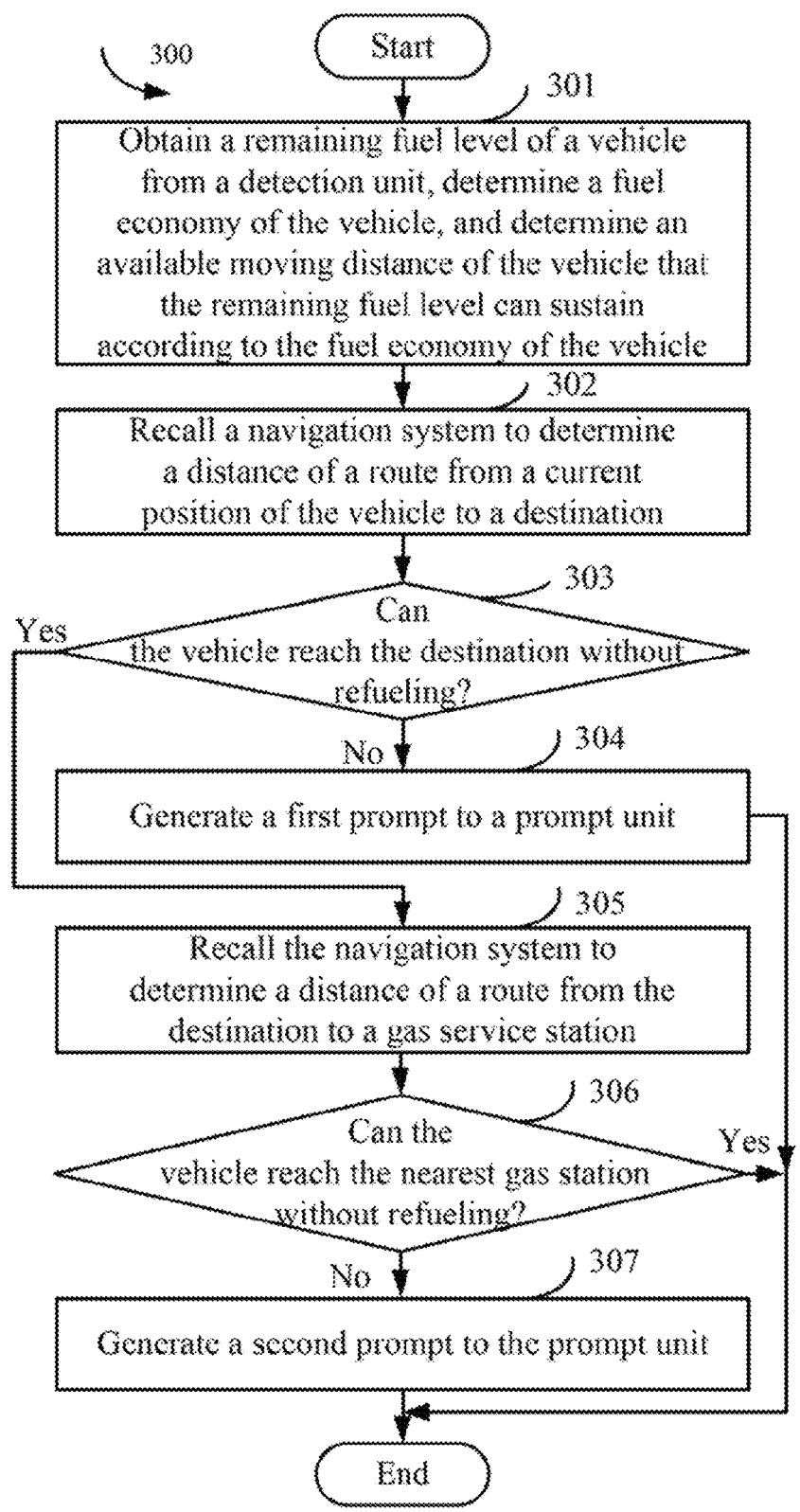
FIG. 3 is a flowchart showing an embodiment of a fuel supply prompting method.

FIG. 3 illustrates an embodiment of a fuel supply prompting method 300. In the embodiment, the method 300 can be executed in response to user operation, such as, inputting a destination in a navigation system. The method 300 is provided by way of example, as there are a variety of ways to carry out the method 300. The method 300 described below can be carried out using the configurations illustrated in FIG. 1, for example, and various elements of these figures are referenced in the explanation of method. Each block shown in FIG. 1 represents one or more processes, methods, or subroutines carried out in the method. Additionally, the illustrated order of blocks is by example only and the order of the blocks can change. The method 300 can begin at block 301.

At block 301, a detection module obtains a remaining fuel level of a vehicle from a detection unit, determines a fuel economy of the vehicle, and determines an available moving distance of the vehicle that the remaining fuel level can sustain (hereinafter available moving distance) according to the fuel economy of the vehicle. In the embodiment, the fuel economy of the vehicle can be provided by a vehicle manufacturer to be a default value, thus the detection module can determine the fuel economy of the vehicle according to the default value. In an alternative embodiment, the fuel economy of the vehicle can be input by a driver depending on driving experience, thus the detection module can determine the fuel economy of the vehicle according to the input fuel economy of the vehicle. In other embodiments, the detection module can detect a movement distance traveled by the vehicle during a preset period (hereinafter traveled distance), detect an amount of fuel consumed by the vehicle during the preset period (hereinafter consumed fuel), and divide the traveled distance by the consumed fuel to determine the fuel economy of the vehicle.

At block 302, an obtaining module recalls a navigation system to determine a distance of a route from a current position of the vehicle to a destination.

At block 303, a determining module compares the available moving distance with the distance of the route from the current position of the vehicle to the destination, to determine whether the vehicle can reach the destination without refueling. If the vehicle cannot reach the destination without refueling, the procedure goes to block 304. If the vehicle can reach the destination without refueling, the procedure goes to block 305. In detail, when the available moving distance is less than a sum of the distance of the route from the current position of the vehicle to the destination and a preset distance, the determining module determines that the vehicle cannot reach the destination without refueling. When the available moving distance is greater than or equal to the sum of the distance of the route from the current position of the vehicle to the destination and the preset distance, the determining module determines that the vehicle can reach the destination without refueling.

At block 304, a prompting module generates a first prompt to the prompt unit. In the embodiment, the first prompt prompts that the vehicle cannot reach the destination without refueling. In other embodiments, the first prompt prompts to refuel the vehicle. In the embodiment, the first prompt can be an audio file, an image, a video file, a light, and/or the like.

At block 305, the obtaining module further recalls the navigation system to determine a distance of a route from the destination to a gas station nearest the destination (hereinafter nearest gas station).

At block 306, the determining module further determines whether the vehicle can reach the nearest gas station without refueling according to the distance of the route from the destination to the nearest gas station. If the vehicle cannot reach the nearest gas station without refueling, the procedure goes to block 307. If the vehicle can reach the nearest gas station without refueling, the procedure stops. In detail, the determining module determines a total distance to be a total of the distance of the route from the current position of the vehicle to the destination and the distance of the route from the destination to the nearest gas station, compares the available moving distance with the total distance to determine whether the vehicle can reach the nearest gas station without refueling. If the available moving distance is greater than or equal to a sum of the total distance and the preset distance, the determining module determines that the vehicle can reach the nearest gas station without refueling. If the available moving distance is less than the sum of the total distance and the preset distance, the determining module determines that the vehicle cannot reach the nearest gas station without refueling.

At block 307, the prompting module further generates a second prompt to the prompt unit. In the embodiment, the second prompt prompts that the vehicle cannot reach the nearest gas station without refueling. In other embodiments, the second prompt prompts to refuel the vehicle. In the embodiment, the second prompt can also be an audio file, an image, a video file, a light, and/or the like.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A vehicle assistance device comprising:
   a storage system;
   a processor; and
   one or more programs stored in the storage system and executed by the processor, the one or more programs operable to:
   obtain a remaining fuel level of a vehicle from a detection unit;
   determine a fuel economy of the vehicle;
   determine an available moving distance of the vehicle that the remaining fuel level can sustain according to the fuel economy of the vehicle;
   recall a navigation system to determine a distance of a route from a current position of the vehicle to a destination;
   compare the available moving distance with the distance of the route from the current position of the vehicle to the destination to determine whether the vehicle can reach the destination without refueling;
   determine that the vehicle can reach the destination without refueling when the available moving distance is greater than or equal to a sum of the distance of the route from the current position of the vehicle to the destination and a preset distance;
   determine that the vehicle cannot reach the destination without refueling when available moving distance is less than the sum of the distance of the route from the current position of the vehicle to the destination and the preset distance;
   generate a first prompt when the vehicle cannot reach the destination without refueling;
   recall the navigation system to determine a distance of a route from the destination to a gas station nearest the destination when the vehicle can reach the destination without refueling;
   determine whether the vehicle can reach the gas station nearest the destination without refueling according to the distance of the route from the destination to the gas station nearest the destination;
   determine a total distance to be a total of the distance of the route from the current position of the vehicle to the destination and the distance of the route from the destination to the gas station nearest the destination, and compare the available moving distance with the total distance;
   determine that the vehicle can reach the gas station nearest the destination without refueling when the available moving distance is greater than or equal to a sum of the total distance and the preset distance;
   determine that the vehicle cannot reach the gas station nearest the destination without refueling when the available moving distance is less than the sum of the total distance and the preset distance;
   generate a second prompt to the prompt unit when the vehicle cannot reach the gas station nearest the destination without refueling.

2. The vehicle assistance device as described in claim 1, wherein the one or more programs are further operable to determine that the fuel economy of the vehicle is a default value provided by a vehicle manufacturer.

3. The vehicle assistance device as described in claim 1, wherein the one or more programs are further operable to determine that the fuel economy of the vehicle is input by a driver depending on driving experience.

4. The vehicle assistance device as described in claim 1, wherein the one or more programs are further operable to detect a movement distance traveled by the vehicle during a preset period, detect an amount of fuel consumed by the vehicle during the preset period, and divide the movement distance traveled by the vehicle during the preset period by the amount of fuel consumed by the vehicle during the preset period to determine the fuel economy of the vehicle.

5. A fuel supply prompting method comprising:
   obtaining a remaining fuel level of a vehicle from a detection unit, determining a fuel economy of the vehicle, and determining an available moving distance of the vehicle that the remaining fuel level can sustain according to the fuel economy of the vehicle;
   recalling a navigation system to determine a distance of a route from a current position of the vehicle to a destination;
   comparing the available moving distance with the distance of the route from the current position of the vehicle to the destination, to determine whether the vehicle can reach the destination without refueling;
   determining that the vehicle can reach the destination without refueling when the available moving distance is greater than or equal to a sum of the distance of the route from the current position of the vehicle to the destination and a preset distance;

determining that the vehicle cannot reach the destination without refueling when the available moving distance is less than the sum of the distance of the route from the current position of the vehicle to the destination and the preset distance;

generating a first prompt when the vehicle cannot reach the destination without refueling;

recalling the navigation system to determine a distance of a route from the destination to a gas station nearest the destination when the vehicle can reach the destination without refueling;

determining whether the vehicle can reach the gas station nearest the destination without refueling according to the distance of the route from the destination to the gas station nearest the destination;

determining a total distance to be a total of the distance of the route from the current position of the vehicle to the destination and the distance of the route from the destination to the gas station nearest the destination, and compare the available moving distance with the total distance;

determining that the vehicle can reach the gas station nearest the destination without refueling when the available moving distance is greater than or equal to a sum of the total distance and the preset distance;

determining that the vehicle cannot reach the gas station nearest the destination without refueling when the available moving distance is less than the sum of the total distance and the preset distance;

generating a second prompt to the prompt unit when the vehicle cannot reach the gas station nearest the destination without refueling.

6. The fuel supply prompting method as described in claim 5, wherein the method further comprises:
determining that the fuel economy of the vehicle is a default value provided by a vehicle manufacturer.

7. The fuel supply prompting method as described in claim 5, wherein the method further comprises:
determining that the fuel economy of the vehicle is input by a driver depending on driving experience.

8. The fuel supply prompting method as described in claim 5, wherein the method further comprises:
detecting a movement distance traveled by the vehicle during a preset period;
detecting an amount of fuel consumed by the vehicle during the preset period; and
dividing the movement distance traveled by the vehicle during the preset period by the amount of fuel consumed by the vehicle during the preset period to determine the fuel economy of the vehicle.

9. A non-transitory storage medium storing a set of instructions, the set of instructions capable of being executed by a processor of a vehicle assistance device, causing the vehicle assistance device to perform a fuel supply prompting method, the method comprising:
obtaining a remaining fuel level of a vehicle from a detection unit, determining a fuel economy of the vehicle, and determining an available moving distance of the vehicle that the remaining fuel level can sustain according to the fuel economy of the vehicle;

recalling a navigation system to determine a distance of a route from a current position of the vehicle to a destination;

comparing the available moving distance with the distance of the route from the current position of the vehicle to the destination, to determine whether the vehicle can reach the destination without refueling;

determining that the vehicle can reach the destination without refueling when the available moving distance is greater than or equal to a sum of the distance of the route from the current position of the vehicle to the destination and a preset distance;

determining that the vehicle cannot reach the destination without refueling when the available moving distance is less than the sum of the distance of the route from the current position of the vehicle to the destination and the preset distance;

generating a first prompt when the vehicle cannot reach the destination without refueling;

recalling the navigation system to determine a distance of a route from the destination to a gas station nearest the destination when the vehicle can reach the destination without refueling;

determining whether the vehicle can reach the gas station nearest the destination without refueling according to the distance of the route from the destination to the gas station nearest the destination;

determining a total distance to be a total of the distance of the route from the current position of the vehicle to the destination and the distance of the route from the destination to the gas station nearest the destination, and compare the available moving distance with the total distance;

determining that the vehicle can reach the gas station nearest the destination without refueling when the available moving distance is greater than or equal to a sum of the total distance and the preset distance;

determining that the vehicle cannot reach the gas station nearest the destination without refueling when the available moving distance is less than the sum of the total distance and the preset distance;

generating a second prompt to the prompt unit when the vehicle cannot reach the gas station nearest the destination without refueling.

10. The non-transitory storage medium as described in claim 9, wherein the method further comprises:
determining that the fuel economy of the vehicle is a default value provided by a vehicle manufacturer.

11. The non-transitory storage medium as described in claim 9, wherein the method further comprises:
determining that the fuel economy of the vehicle is input by a driver depending on driving experience.

12. The non-transitory storage medium as described in claim 9, wherein the method further comprises:
detecting a movement distance traveled by the vehicle during a preset period;
detecting an amount of fuel consumed by the vehicle during the preset period; and
dividing the movement distance traveled by the vehicle during the preset period by the amount of fuel consumed by the vehicle during the preset period to determine the fuel economy of the vehicle.

* * * * *